(12) United States Patent
Jung et al.

(10) Patent No.: US 12,518,460 B2
(45) Date of Patent: Jan. 6, 2026

(54) METHOD AND DEVICE FOR DISPLAYING SCREEN DEPENDING UPON INDOOR POSITIONING

(71) Applicant: VESTELLALAB INC., Seoul (KR)

(72) Inventors: Sangsu Jung, Uiwang-si (KR); Eunjung Lee, Uiwang-si (KR); Young Soo Lee, Gunpo-si (KR); Dhananjay Singh, Yongin-si (KR)

(73) Assignee: VESTELLALAB INC., Seoul (KR)

( * ) Notice: Subject to any disclaimer, the term of this patent is extended or adjusted under 35 U.S.C. 154(b) by 71 days.

(21) Appl. No.: 18/008,905

(22) PCT Filed: Oct. 8, 2021

(86) PCT No.: PCT/KR2021/013896
§ 371 (c)(1),
(2) Date: Dec. 7, 2022

(87) PCT Pub. No.: WO2022/108113
PCT Pub. Date: May 27, 2022

(65) Prior Publication Data
US 2023/0274486 A1    Aug. 31, 2023

(30) Foreign Application Priority Data
Nov. 19, 2020   (KR) .................. 10-2020-0155904

(51) Int. Cl.
*G06T 13/80*   (2011.01)
*G01C 21/16*   (2006.01)
*G01C 21/20*   (2006.01)

(52) U.S. Cl.
CPC .............. *G06T 13/80* (2013.01); *G01C 21/16* (2013.01); *G01C 21/206* (2013.01)

(58) Field of Classification Search
CPC ...... G06T 13/80; G01C 21/16; G01C 21/206; G01C 21/3647; G01C 21/3605; G01C 21/3667; G01C 21/383
See application file for complete search history.

(56) References Cited

U.S. PATENT DOCUMENTS

| | | | |
|---|---|---|---|
| 11,085,790 B2 | 8/2021 | Marusco et al. | |
| 2012/0203453 A1* | 8/2012 | Lundquist | G01C 21/16 701/434 |
| 2021/0156695 A1* | 5/2021 | Zhang | G06T 19/006 |

FOREIGN PATENT DOCUMENTS

| | | |
|---|---|---|
| JP | 2015528897 A | 10/2015 |
| JP | 5957906 B | 7/2016 |

(Continued)

*Primary Examiner* — Rodney A Butler
(74) *Attorney, Agent, or Firm* — Maschoff Brennan

(57) ABSTRACT

A screen display method depending upon one embodiment of the present invention comprises: a step for setting, for an indoor space, depending upon a preset rule on a movement path on which a moving object can move, node data comprising information about the location of a positioning sensor; a first display step for, on the basis of first positioning data of a first point of the moving object, generating and displaying a first correction UI moving in a first direction in which the moving object moves, the first correction UI being displayed in a corrected speed compared to the actual speed of the moving object from a first start node to a first end node; and a step for determining a succeeding display step by determining whether the moving object rotates at the first end node.

16 Claims, 11 Drawing Sheets

(56) References Cited

FOREIGN PATENT DOCUMENTS

| | | |
|---|---|---|
| KR | 20100024631 A | 3/2010 |
| KR | 100978060 B1 | 8/2010 |
| KR | 20190112929 A | 10/2019 |

* cited by examiner

[FIG. 1]
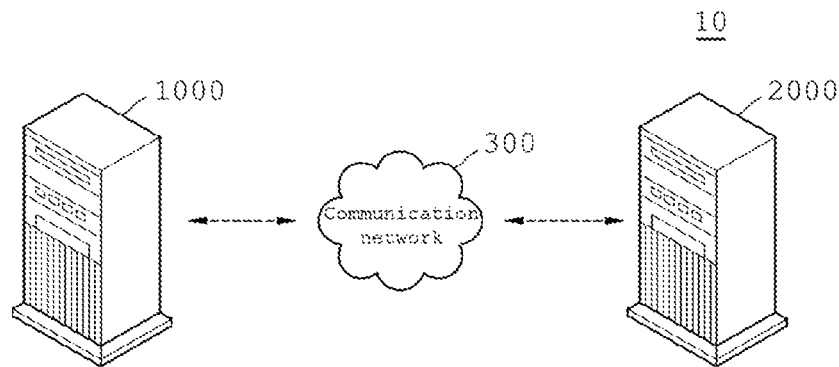
[FIG. 2]
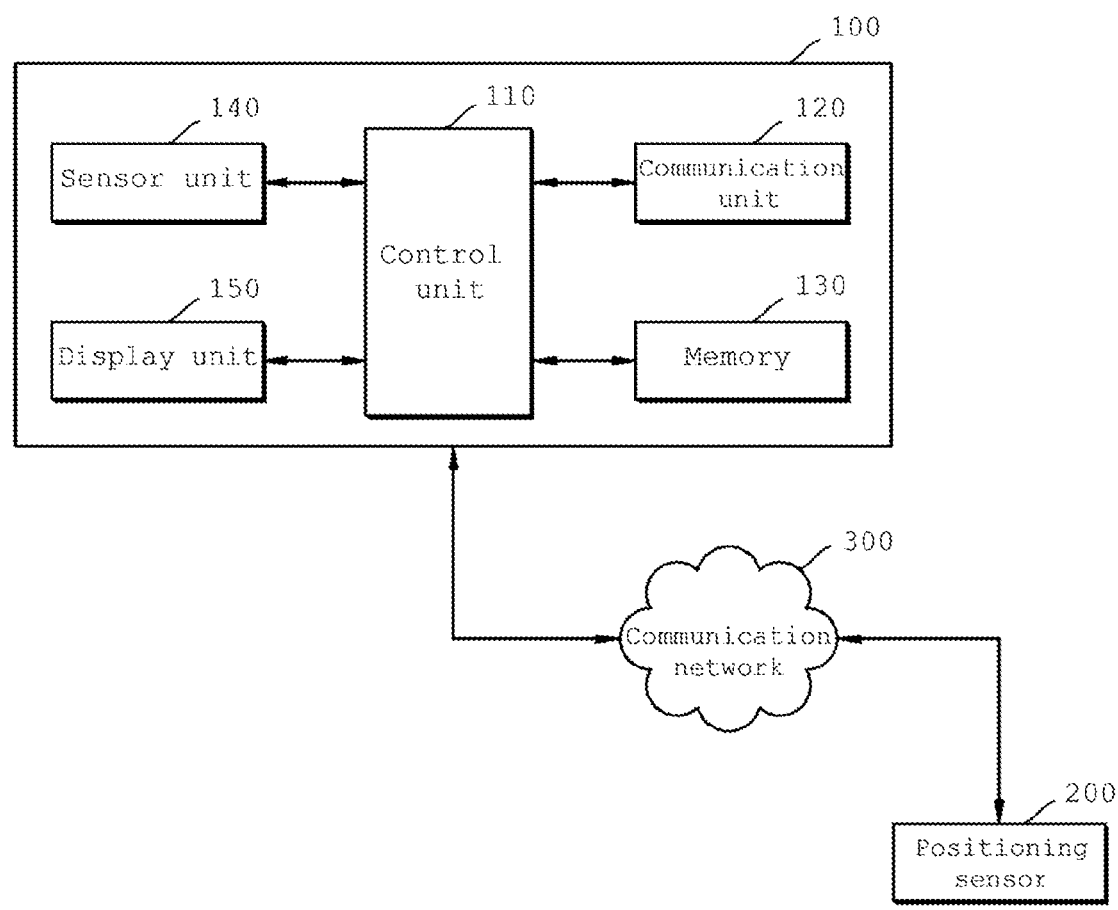

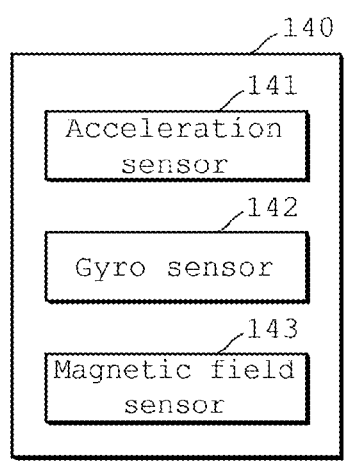
[FIG. 3]

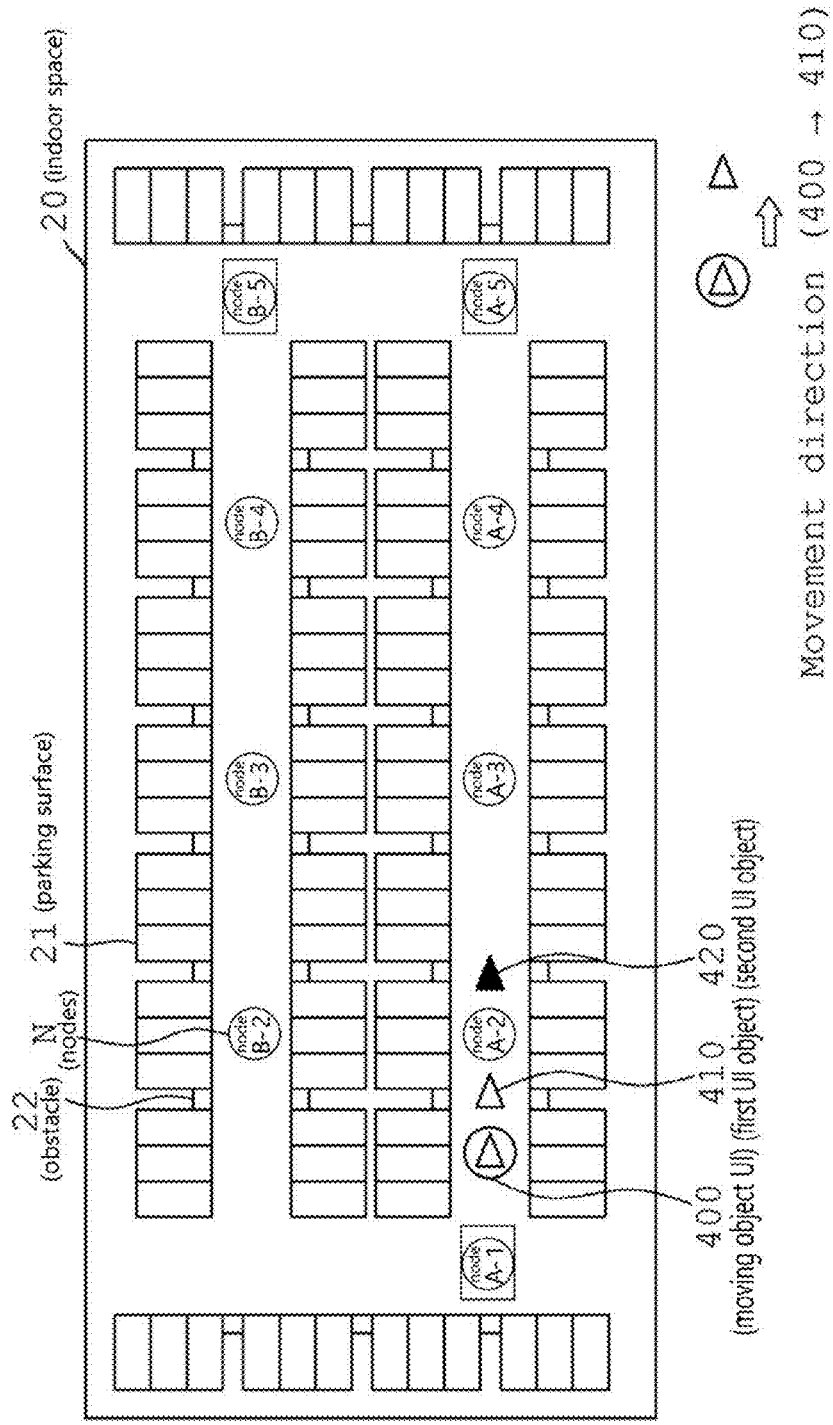
[FIG. 4]

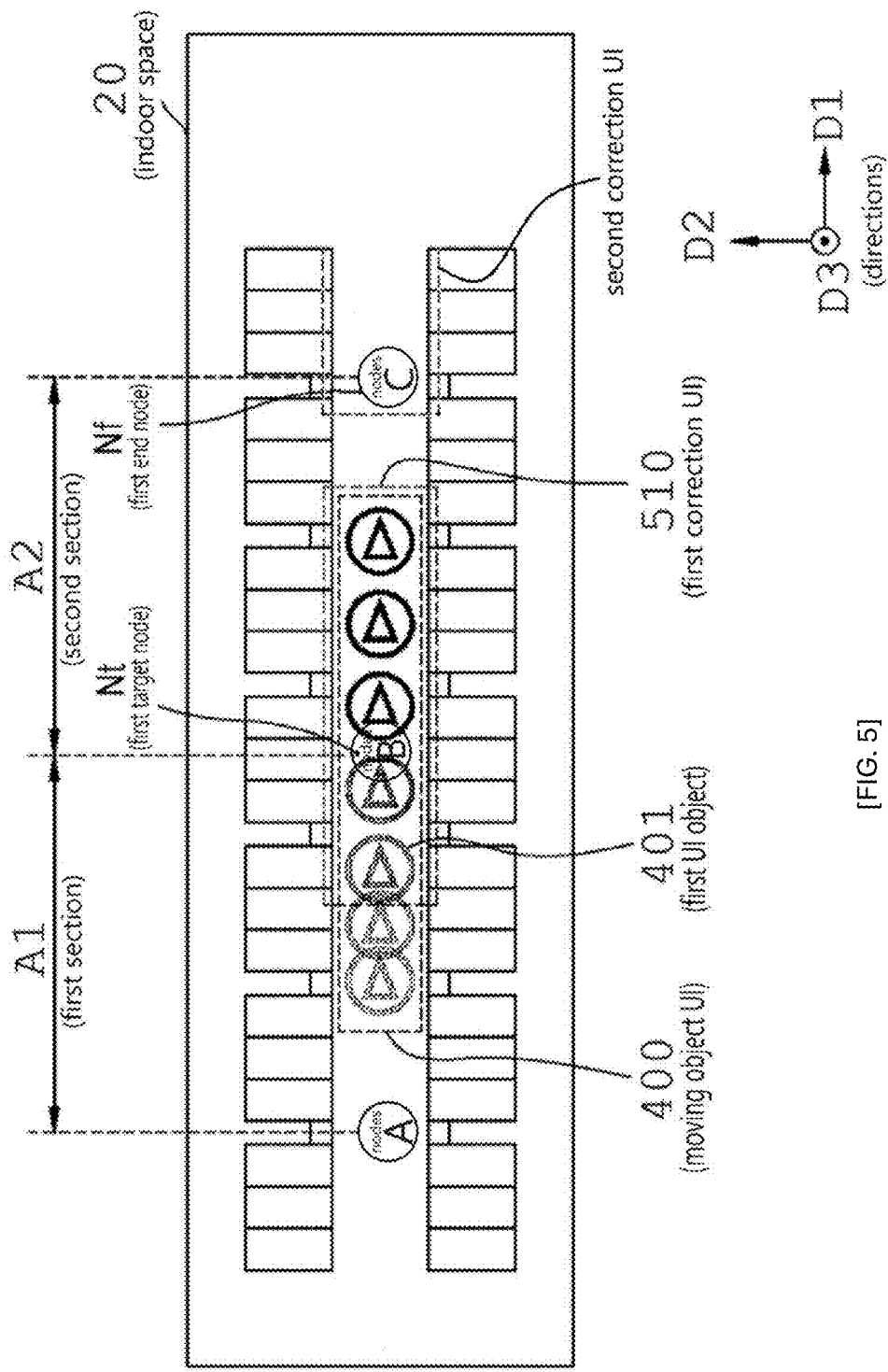
[FIG. 5]

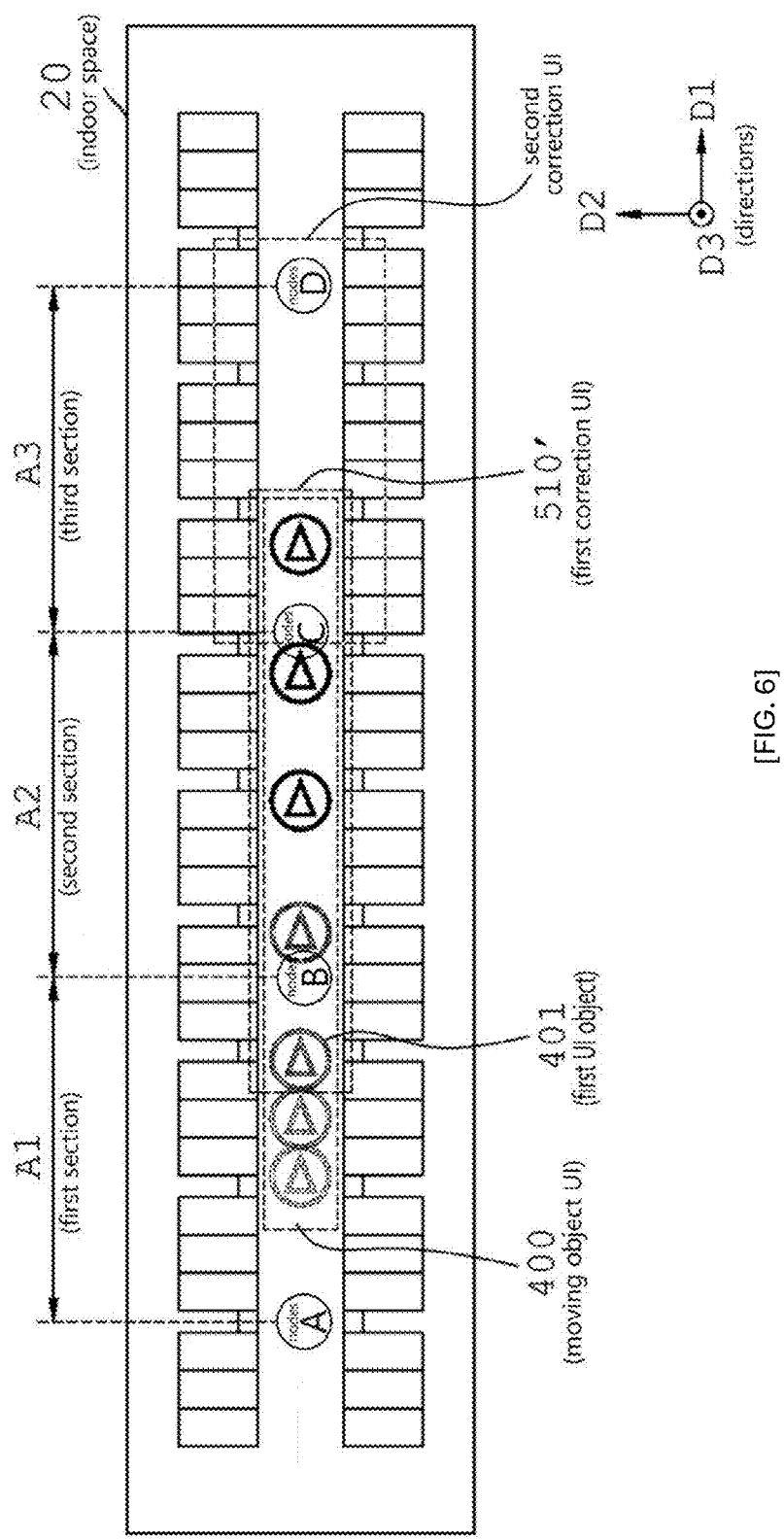
[FIG. 6]

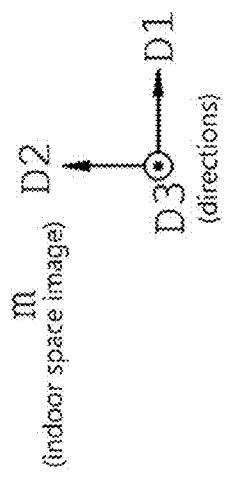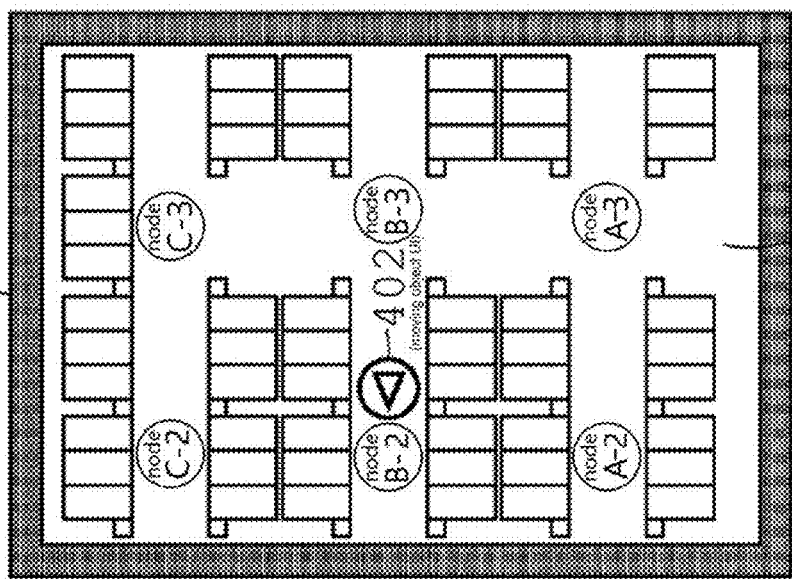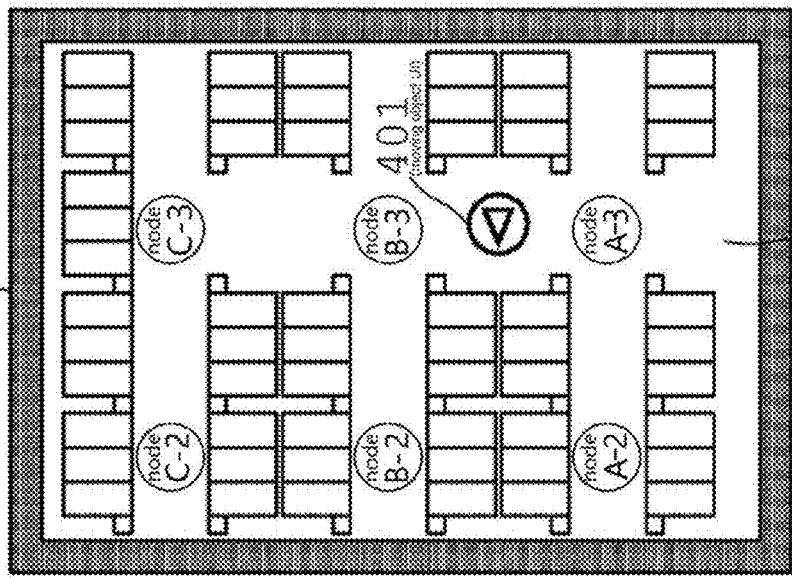
[FIG. 7]

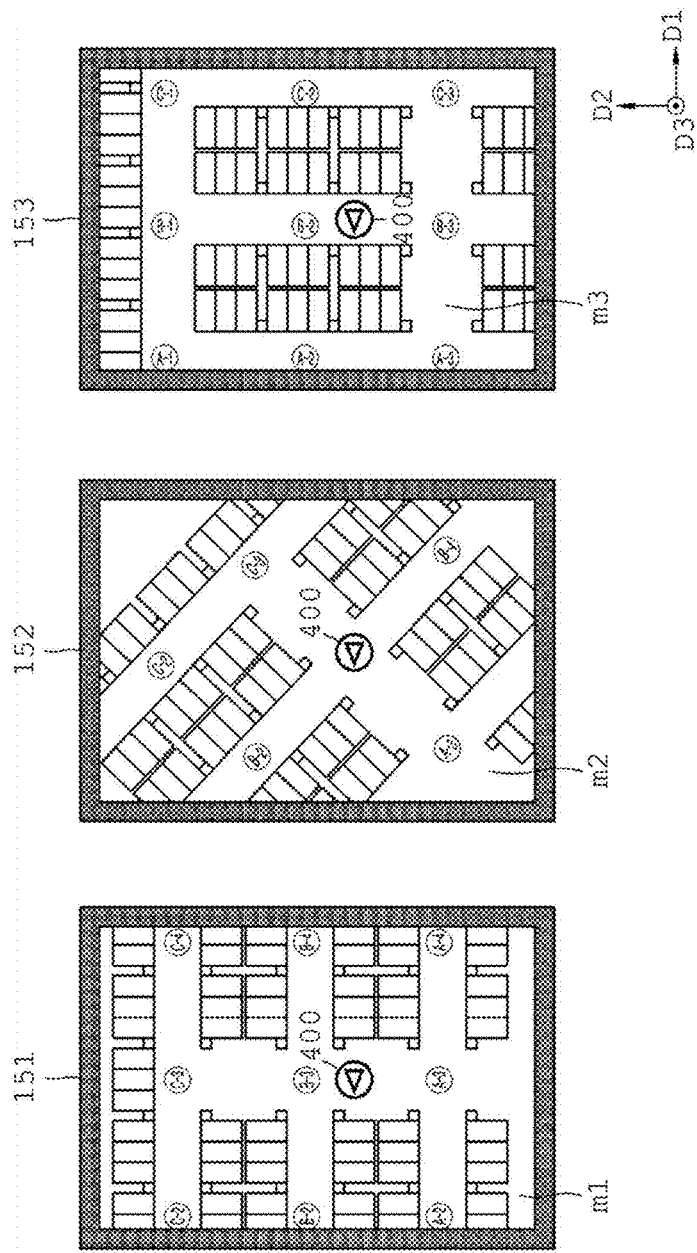

[FIG. 9]
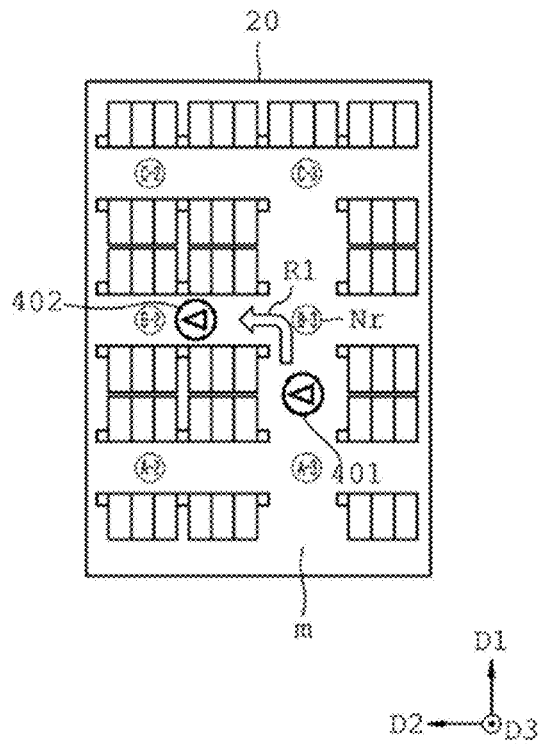
[FIG. 10]
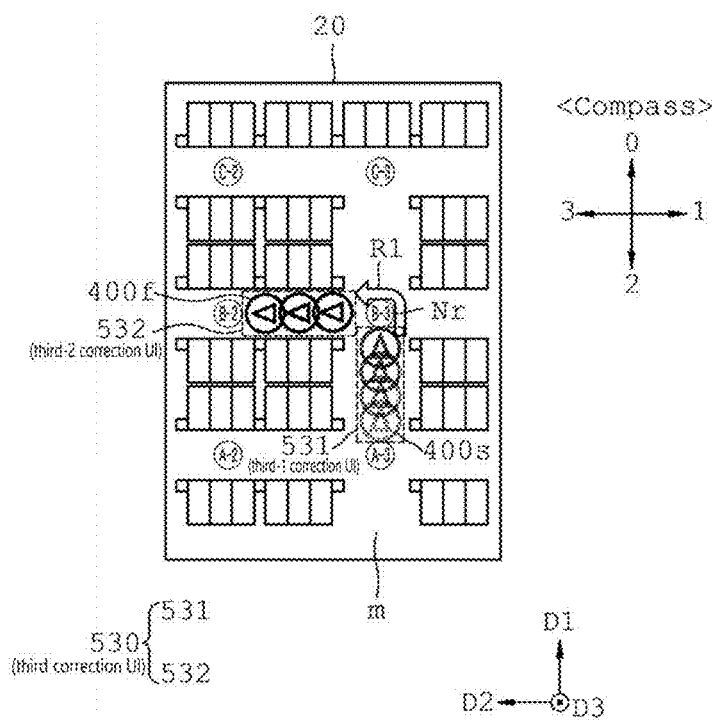

[FIG. 11]
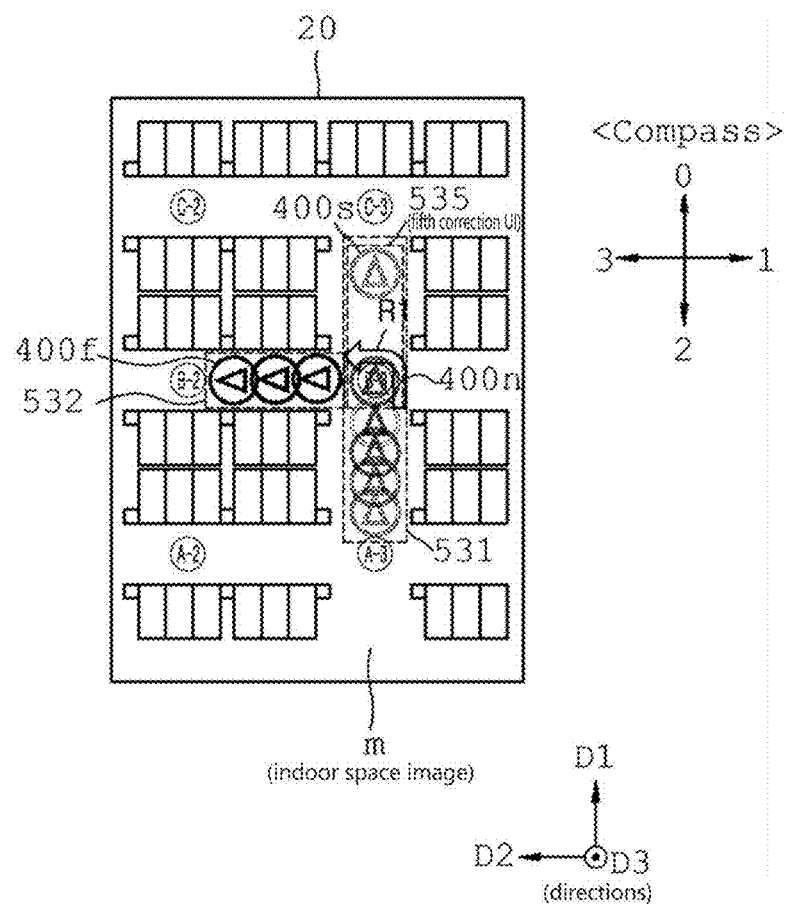
[FIG. 12]
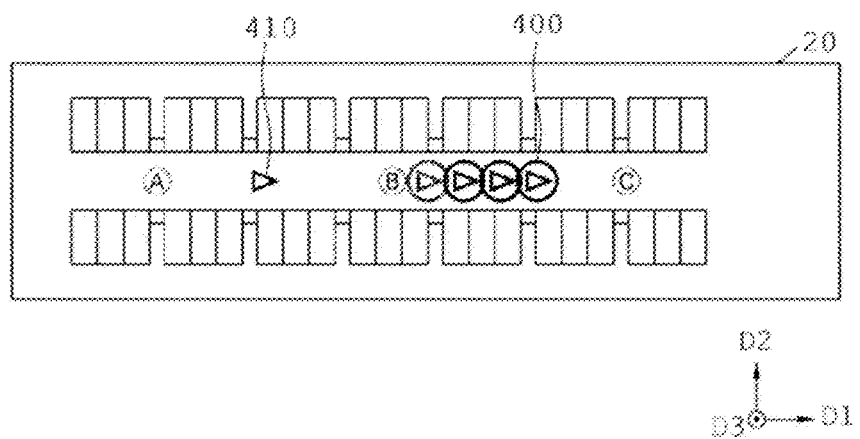

[FIG. 13]
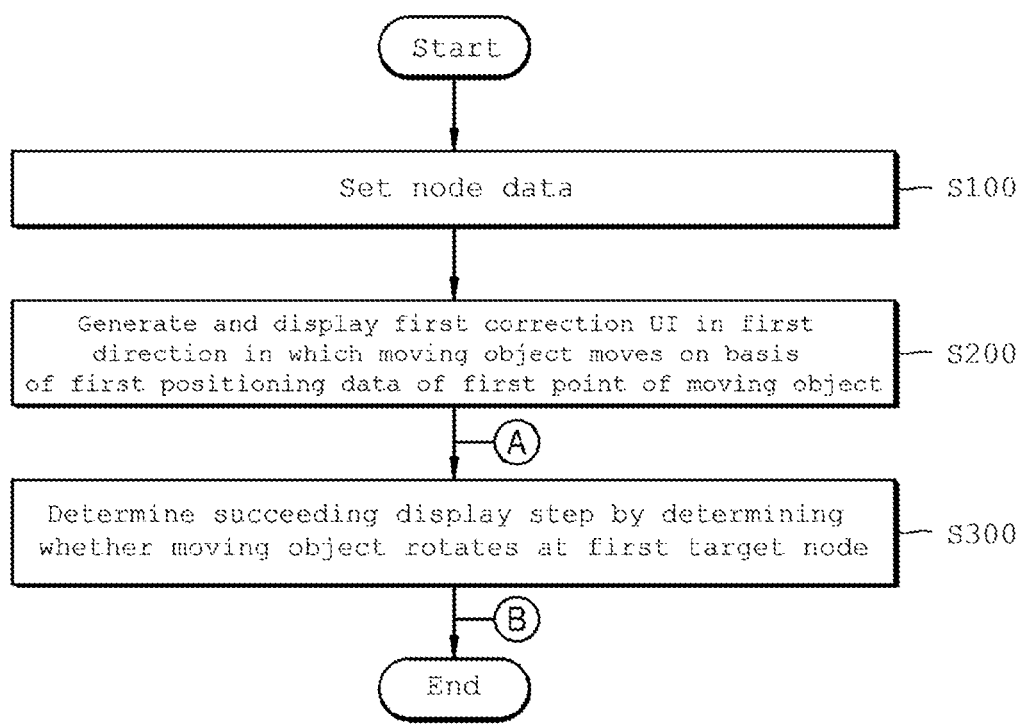

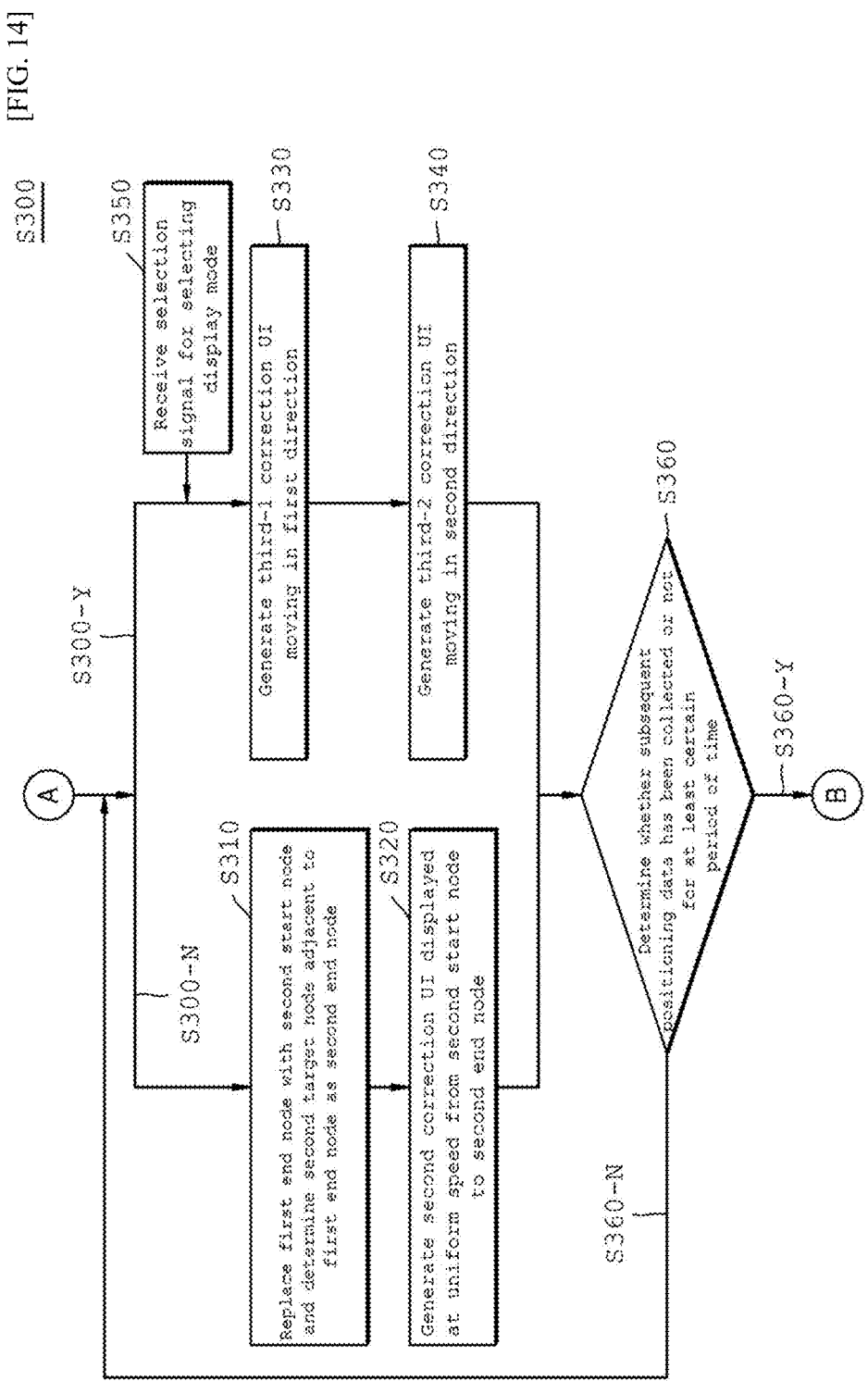

METHOD AND DEVICE FOR DISPLAYING SCREEN DEPENDING UPON INDOOR POSITIONING

TECHNICAL FIELD

The present invention relates to a method and a device for displaying screen depending upon indoor positioning.

BACKGROUND ART

In general, a location may be determined using a GPS signal outdoors. In an outdoor environment, however, the influence of structures or obstacles which interfere with signal transmission and reception is small, and the error of signal transmission and reception is not large. However, when positioning indoors, there is a problem in that positioning accuracy is deteriorated due to a failure or an error of GPS signal reception caused by structures such as ceilings, walls, pillars, etc.

As a positioning method developed in response to the above problem, there are trilateration using a positioning sensor such as a beacon, Wi-Fi, etc., a fingerprint, a camera technique, and the like. However, the signal of the positioning sensor also has a limit in improving the accuracy of positioning due to an error caused by a surrounding environment.

Meanwhile, recently, a navigation device is provided in a moving object such as a vehicle or a navigation function is provided in a separate mobile device, etc. The navigation device performs route guidance to a destination set by a vehicle driver while moving along with a moving object. However, as described above, since the accuracy of positioning is deteriorated due to errors in positioning data in an indoor environment, there is a problem in securing accuracy even in a screen display method depending upon indoor positioning, and accordingly there are limitations in providing accurate real-time navigation services to users.

DISCLOSURE

Technical Problem

Embodiments of the present invention are intended to provide a method and device for displaying a screen depending upon indoor positioning, which may not only improve accuracy even in an indoor environment, but also provide a smoother and more seamless visual guidance effect to users.

Technical Solution

A screen display method depending upon indoor positioning depending upon one embodiment of the present invention may include: setting, for an indoor space, depending upon a preset rule on a movement path on which a moving object may move, node data including information about a location of a positioning sensor; a first displaying for, on the basis of first positioning data of a first point of the moving object, generating and displaying a first correction UI moving in a first direction in which the moving object moves, the first correction UI (user interface) being displayed in a corrected speed compared to the actual speed of the moving object from a first start node to a first end node; and determining a succeeding displaying by determining whether the moving object rotates at the first end node.

The first displaying may include: determining the first start node on the basis of the first positioning data; determining a first target node for which the first positioning data obtained by using the node data satisfies a preset reference value; determining the first end node on the basis of the first target node; and generating and displaying a first correction UI displayed at a uniform speed from the first start node to the first end node.

If it is determined that the moving object does not rotate in the determining of the succeeding displaying, the succeeding displaying may include a second displaying for generating and displaying a second correction UI moving from a second start node extending in the first direction to a second end node, in which the second displaying may include: replacing the first end node with the second start node and determining a second target node adjacent to the first end node as the second end node; and generating and displaying a second correction UI displayed at a uniform speed from the second start node to the second end node.

If it is determined that the moving object rotates in the determining of the succeeding displaying, the succeeding displaying may include a third displaying for generating and displaying a third correction UI moving in a second direction different from the first direction, in which the third displaying may include: generating third-1 correction UI moving in the first direction from the first start node to the first end node; and generating third-2 correction UI moving in the second direction toward a third end node determined based on a third target node adjacent to the first end node in the second direction.

The screen display method may further include receiving a selection signal for a display mode, in which the display mode may include an object switching mode in which an indoor space image is fixed and a moving object UI moves and a background switching mode in which the moving object UI is fixed and the indoor space image moves.

The generating of third-1 correction UI may further include comparing a precedence relationship between the first end node and a subsequent node corresponding to subsequent positioning data obtained at a second point after the first point, and may include, if it is determined depending upon the comparison result that the subsequent node is located before the first end node in the first direction, rotating any one of the moving object UI and the indoor space image depending upon the display mode selected depending upon the selection signal based on the first end node between the generating of third-1 correction UI and the generating of third-2 correction UI.

The generating of third-1 correction UI may further include comparing a precedence relationship between the first end node and a subsequent node corresponding to subsequent positioning data obtained at a second point after the first point, and wherein if it is determined depending upon the comparison result that the subsequent node is located before the first end node in the first direction, the generating of third-1 correction UI may include: generating a fifth correction UI for refreshing a location of the moving object to the first end node; and rotating any one of the moving object UI and the indoor space image depending upon the display mode selected depending upon the selection signal based on the first end node.

At least one of the first displaying and the succeeding displaying may include: calculating a distance between a location of the moving object UI displayed based on the first positioning data and a location corresponding to the first positioning data; and performing an operation of stop correction of the moving object UI, if a location of the moving object UI is ahead of a location corresponding to the first positioning data by a predetermined distance.

A screen display device depending upon indoor positioning depending upon one embodiment of the present invention may include a control unit, in which the control unit may be configured to set, for an indoor space, depending upon a preset rule on a movement path on which a moving object is movable, node data including information about a location of a positioning sensor; generate and display a first correction UI moving in a first direction in which the moving object moves on the basis of first positioning data of a first point of the moving object, the first correction UI being displayed in a corrected speed compared to an actual speed of the moving object from a first start node to a first end node; and determine a succeeding displaying by determining whether the moving object rotates at the first end node.

The control unit may be configured to determine the first start node on the basis of the first positioning data when generating and displaying the first correction UI; determine a first target node for which the first positioning data obtained by using the node data satisfies a preset reference value; determine the first end node on the basis of the first target node; and generate and display the first correction UI displayed at a uniform speed from the first start node to the first end node.

If it is determined that the moving object does not rotate when the control unit determines the succeeding displaying, the succeeding displaying may be configured to generate and display a second correction UI moving from a second start node extending in the first direction to a second end node, in which the control unit may be configured to replace the first end node with the second start node and determine a second target node adjacent to the first end node as the second end node, and generate a second correction UI displayed at a uniform speed from the second start node to the second end node.

If it is determined that the moving object rotates when the control unit determines the succeeding displaying, the succeeding displaying may be configured to generate and display a third correction UI moving in a second direction different from the first direction, in which the control unit may be configured to generate third-1 correction UI moving in the first direction from the first start node to the first end node, and generate third-2 correction UI moving in the second direction toward a third end node determined based on a third target node adjacent to the first end node in the second direction.

The screen display device may be configured to receive a selection signal for a display mode, in which the display mode may include an object switching mode in which an indoor space image is fixed and a moving object UI moves and a background switching mode in which the moving object UI is fixed and the indoor space image moves.

When generating the third-1 correction UI, the control unit may be configured to compare a precedence relationship between the first end node and a subsequent node corresponding to subsequent positioning data obtained at a second point after the first point, and if it is determined depending upon the comparison result that the subsequent node is located before the first end node in the first direction, the control unit may be configured to rotate any one of the moving object UI and the indoor space image depending upon the display mode selected depending upon the selection signal based on the first end node after generating the third-1 correction UI and before generating the third-2 correction UI.

When generating the third-1 correction UI, the control unit may be configured to compare a precedence relationship between the first end node and a subsequent node corresponding to subsequent positioning data obtained at a second point after the first point, and if it is determined depending upon the comparison result that the subsequent node is ahead of the first end node in the first direction, the control unit may be configured to generate a fifth correction UI for refreshing a location of the moving object to the first end node, and rotate any one of the moving object UI and the indoor space image depending upon the display mode selected depending upon the selection signal based on the first end node.

When performing any one of the displaying of the first correction UI and the succeeding displaying, the control unit may be configured to calculate a distance between a location of the moving object UI displayed based on the first positioning data and a location corresponding to the first positioning data, and perform an operation of stop correction of the moving object UI, if a location of the moving object UI is ahead of a location corresponding to the first positioning data by a predetermined distance.

Advantageous Effects

Depending upon embodiments of the present invention, a method and a device for displaying a screen with improved accuracy in real time may be provided by using a positioning algorithm which utilizes node data within a movable path.

In addition, depending upon the embodiments of the present invention, it may be possible to provide a smoother and more seamless visual effect and thus high-quality navigation service to users by correcting errors generated when performing an indoor positioning algorithm.

DESCRIPTION OF DRAWINGS

FIG. 1 is a view schematically showing a configuration of a screen display system depending upon one embodiment of the present invention.

FIG. 2 is a view more specifically showing a configuration of a screen display system depending upon one embodiment of the present invention.

FIG. 3 is a view showing a configuration of a sensor unit depending upon one embodiment of the present invention.

FIG. 4 is a view for explaining node data depending upon one embodiment of the present invention.

FIG. 5 is a view for explaining a single path display method depending upon one embodiment of the present invention.

FIG. 6 is a view for explaining a single path display method depending upon another embodiment of the present invention.

FIG. 7 is a view for explaining a display mode depending upon one embodiment of the present invention.

FIG. 8 is a view for explaining a display mode depending upon another embodiment of the present invention.

FIG. 9 is a view for explaining a display method during rotation.

FIG. 10 is a view for explaining a screen display method during rotation depending upon one embodiment of the present invention.

FIG. 11 is a view for explaining a screen display method during rotation depending upon another embodiment of the present invention.

FIG. 12 is a view for explaining a method for generating a correction UI depending on whether it is stopped or not depending upon one embodiment of the present invention.

FIG. 13 is a flowchart for explaining a screen display method depending upon one embodiment of the present invention.

FIG. 14 is a flowchart for more specifically explaining a part of a screen display method depending upon one embodiment of the present invention.

MODE FOR INVENTION

The present invention may be applied with various modifications and have various embodiments, but specific embodiments will be illustrated in the drawings and described in detail in the detailed description. Effects and features of the present invention and methods of achieving the same will become apparent with reference to the embodiments described below in detail along with the accompanying drawings. However, the present invention may be implemented in various forms without limitation to the embodiments disclosed below.

Hereinafter, the embodiments of the present invention will be described in detail with reference to the accompanying drawings, and when described with reference to the drawings, the same or corresponding components are given the same reference numerals, and the overlapping description thereof will be omitted.

In the following embodiments, terms such as first, second, etc. are used for the purpose of distinguishing one component from another without limiting meaning. In the following embodiments, the terms of a singular form may include plural forms unless otherwise specified. In the following embodiments, terms such as "include," "have," or the like mean that the features or components described in the specification are present, and the possibility that one or more other features or components may be added is not excluded in advance. In the drawings, the size of the components may be exaggerated or reduced for convenience of description. For example, since the size and shape of each component shown in the drawings are arbitrarily indicated for convenience of description, the present invention is not necessarily limited to what is shown.

FIG. 1 is a view schematically showing a configuration of a screen display system 10 depending upon one embodiment of the present invention.

The screen display system 10 depending upon one embodiment of the present invention may include a screen display server 1000 and an indoor space server 2000. The two servers 1000 and 2000 may communicate through a communication network 300 and exchange data with each other.

The screen display server 1000 may perform indoor positioning of a moving object which moves in an indoor space. For this purpose, the screen display server 1000 may include the screen display device 100 as shown in FIGS. 2 and 3, which will be described in more detail with reference to FIGS. 2 and 3 to be described later. The screen display server 1000 may be a server which manages a positioning application installed in the screen display device 100. The screen display server 1000 and the screen display device 100 may exchange data with each other through the application.

The indoor space server 2000 may be a server related to the indoor space in which the moving object to be positioned in the present disclosure moves. The indoor space of the present disclosure may be various spaces having obstacles in receiving GPS signals, such as indoor/underground parking lots, tunnels, underground roads, underground shopping malls, inside of buildings, and the like. The indoor space server 2000 may be a local server present in each individual indoor space, or may be a central server which manages information about several indoor spaces. Hereinafter, the indoor space may be described, for example, as an indoor parking lot and the indoor space server 2000 may be described as a parking lot server. The indoor space server 2000 may include a positioning sensor 200 as shown in FIG. 2 for indoor positioning of the moving object.

Depending upon embodiments, an operating body of the screen display server 1000 and the indoor space server 2000 may be the same.

The communication network 300 may mean a communication network which mediates data transmission and reception between respective components of the positioning system 10. For example, the communication network 300 may encompass wired networks such as local area networks (LANs), wide area networks (WANs), metropolitan area networks (MANs), integrated service digital networks (ISDNs), etc., or wireless networks such as Wi-Fi, wireless LANs, CDMA, Bluetooth, satellite communications, etc., but the scope of the present invention is not limited thereto.

Hereinafter, a configuration of the screen display system 10 depending upon one embodiment of the present invention will be described in more detail with reference to both FIGS. 2 and 3. FIG. 2 is a view more specifically showing a configuration of a screen display system 10 depending upon one embodiment of the present invention, and FIG. 3 is a view showing a configuration of a sensor unit 140 depending upon one embodiment of the present invention.

The screen display device 100 may be a device corresponding to a moving object such as a vehicle, etc., and may be a mobile terminal such as a mobile phone, a tablet PC, or the like, which is owned by an owner of the vehicle, or may be an electronic device connected to or built into the vehicle. An application for performing an indoor positioning method for a moving object depending upon one embodiment of the present invention may be installed in the screen display device 100. Hereinafter, the location concept of the moving object may be described in combination with the location concept of the screen display device 100.

The screen display device 100 may include a control unit 110, a communication unit 120, a memory 130, a sensor unit 140, and a display unit 150. In addition, although not shown in this drawing, an input/output interface, etc., other than the display unit 150 may be further included.

The control unit 110 may perform an operation of overall controlling the screen display device 100. A specific operation of the control unit 110 will be described in more detail in related drawings to be described later.

The control unit 110 may include all types of devices capable of processing data, such as a processor. Herein, a "processor" may refer to a data processing device built in hardware having a physically structured circuit to perform functions expressed by codes or instructions included in a program, for example. As one example of the data processing unit built in the hardware, there may be processing devices such as a microprocessor, a central processing unit (CPU), processor core, multiprocessor, application-specific integrated circuit (ASIC), field programmable gate array (FPGA), etc., but the scope of the present invention is limited thereto.

The communication unit 120 may be a device including hardware and software necessary for transmitting and receiving control signals, data or the like through the communication network 300 depending upon various types of communication methods. The communication unit 120 may communicate with various types of external devices and servers, such as the positioning sensor 200 or the indoor space server 2000 of FIG. 2.

The memory 130 may temporarily and/or permanently store all types of data generated and processed by the screen display device 100. The memory 130 may store program applications, data, commands, etc. installed in the screen display device 100 and store all types of data input and output through the screen display device 100. The memory 130 may include a random access memory (RAM), a read only memory (ROM) and a permanent mass storage device such as a disk drive, a flash storage medium, a solid state drive (SSD), and the like, but the scope of the present invention is not limited thereto.

Herein, the sensor unit 140 will be described with reference to FIG. 3. The sensor unit 140 may be a sensor for obtaining movement information including the location of a moving object, whether or not the object has moved, a movement direction/angle, and a posture, and may include a plurality of sensors for sensing the state of the inside or outside of the device 100. The sensor unit 140 may include at least one of an accelerometer 141, a gyroscope 142, and a magnetic field sensor 143. First sensing data about the movement information of the moving object may be obtained through the sensor unit 140.

The accelerometer 141 may sense the acceleration of the moving object and may be a three-axis sensor of X-axis, Y-axis, and Z-axis. The gyroscope 142 may sense the angular velocity of the moving object and may be a three-axis sensor of Rx, Ry, and Rz. The accelerometer 141 may measure the movement inertia of the moving object by using the acceleration of the moving object (g (1 g=9.8 m/s2) as one example of the unit), and the gyroscope 142 may measure a rotational inertia and/or a rotation rate (deg/sec as one example of the unit) by using the angular velocity of the moving object. For example, the control unit 110 may obtain the movement information of the moving object by using sensing values of the accelerometer 141 and the gyroscope 142. With regard to the movement information, the control unit 110 may obtain rotation information (amount of angle change) and speed information including information on the roll angle, pitch angle and yaw angle of the moving object.

The magnetic field sensor 143 may measure the azimuth of the moving object. The range of variation of the sensing values obtained by the magnetic field sensor 143 may decrease when the moving object is stationary without moving. When the change value of an outputted sensor value is equal to or less than a preset reference, it may be determined that the vehicle is in a stopped state. The control unit 110 may reduce an error when determining whether the moving object moves or rotates by using the sensing value of the magnetic field sensor 143 together with the sensing value of the accelerometer 141 and the gyroscope 142. As such, the screen display device 100 may determine the motion and speed information of the moving object in various directions in three dimensions including the three axes based on the first sensing data obtained through the sensor unit 140.

Referring back to FIG. 2, the display unit 150 may display data input and output through the screen display device 100. Positioning data processed and output by the indoor positioning method depending upon one embodiment of the present invention may be displayed through the display unit 150 in an output method depending upon the operation of a positioning application stored in the screen display device 100. FIGS. 4 to 8 to be described later are examples of display screens output through the display unit 150.

Depending upon embodiments, the screen display device 100 may be provided separately from the screen display server 1000 outside the screen display server 1000.

The indoor space server 2000 may include the positioning sensor 200 installed in an indoor space for indoor positioning of the moving object. As one example, the positioning sensor 200 may be a beacon module which transmits a beacon signal including a beacon ID through the communication network 300. The beacon signal may include a universally unique identifier (UUID), a major ID, a minor ID, and a received signal strength indication (RSSI). As one example, the major ID and the minor ID may consist of three digit numbers, and a unique number for each floor may be assigned to the hundreds' digit, and a unique number for each beacon may be assigned to the tens' digit and the ones' digit. RSSI may correspond to the strength of the beacon signal. In this case, the positioning sensor 200 may periodically wirelessly transmit the beacon signal to the screen display server 1000 through all available wireless communication networks 300 such as Wi-Fi, Bluetooth, Zigbee, long term evolution (LTE), 3G, etc.

Hereinafter, data obtained by the positioning sensor 200 may refer to second sensing data, and the second sensing data may mean the beacon signal.

FIG. 4 is a view for explaining node data depending upon one embodiment of the present invention, and is an example of a display screen displayed through the display unit 150.

On the display screen, an indoor space 20, a parking surface 21, an obstacle 22, etc. may be shown in the form of data-processed images, and the parking surface 21 and the obstacle 22 may be appropriately disposed in the actual indoor space 20. Hereinafter, the indoor space 20 will be described as an example of a parking lot 20.

The control unit 110 may set node data including information about the location of the positioning sensor 200 depending upon a rule set in advance on a movement path through which the moving object may move with respect to the indoor space 20.

In the indoor space 20, a remaining space excluding the parking surface 21 and the obstacle 22 may be a movement path through which the moving object may move. A plurality of nodes N indicating the locations of the positioning sensor 200 (see FIG. 2) installed depending upon preset rules are shown on the movement path. Hereinafter, the "location of node N" and the "location of the positioning sensor 200" may be used interchangeably for description. The positioning sensors 200 may be installed at regular intervals depending upon preset rules on the movement path. The nodes may also be set on the parking surface 21 depending upon an embodiment.

As one example, in FIG. 4, the plurality of nodes N may include node A on a first movement path and node B on a second movement path, while nodes A may include A-1, A-2, A-3, A-4, and A-5 nodes, and node B may include nodes B-1, B-2, B-3, B-4, and B-5. However, the location and number of the plurality of nodes N are not limited thereto.

Node data depending upon one embodiment of the present invention relates to location information where the positioning sensor 200 may be installed, and the location information may include an ID of the positioning sensor 200, self-location information of each of a plurality of nodes N, and connection information between nodes different from each other.

The plurality of nodes N may include a first node where a positioning operation starts, a final node where the positioning operation ends, a rotational node located at an intersection such as a three-way intersection, crossroads, or the like, an intermediate node located between the nodes, and the like. As one example, the first node may correspond to an entrance of the indoor space, and the final node may correspond to an exit of the indoor space. In FIG. 4, node A-1 may be the first node, node B-1 may be the final node, nodes A-5 and B-5 may be rotational nodes, and other nodes may be intermediate nodes. As such, the positioning sensor 200 may be installed on a straight path of the moving object, a point where the direction of the moving object is changed, such as an intersection, and the like. At this time, if a distance between two adjacent positioning sensors 200 on the straight path is larger than a predetermined reference, an additional positioning sensor 200 may be installed therebetween to increase the accuracy of positioning.

The control unit 110 may use at least one of the node data, first sensing data obtained through the sensor unit 140, and second sensing data obtained through the positioning sensor 200 provided in the indoor space 20, so as to obtain first positioning data capable of determining a first section in which the object is currently located. For example, the first positioning data may include current location coordinates as the current location of the moving object (at the starting point of a positioning operation), distance information between the screen display device 100 and the positioning sensor 200, and the like.

After that, the controller 110 may determine whether the first positioning data satisfies a preset reference value for a boundary node defining the first section. For example, if the first section in FIG. 4 is a section between nodes A-2 and A-3, two nodes A-2 and A-3 may be boundary nodes of the first section. For example, whether the reference value is satisfied may be determined is determined when a calculated distance between the positioning sensor 200 and the screen display device 100 is less than or equal to a certain value, that is, depending upon whether the moving object has come close to the specific positioning sensor 200 within a certain distance. If it is determined that the reference value is satisfied, the following positioning operation (next positioning sensor 200) may be performed. Depending upon an embodiment, conditions for satisfying the reference value may refer to how continuously and how frequently the screen display device 100 receives sensor signals from various positioning sensors 200, and may be changed within various ranges for convenience of positioning. Depending upon an embodiment, conditions for satisfying the reference values may refer to whether the indoor positioning device 100 and various positioning sensors 200 are relatively close by using the RSSI data, which may be used together with the above-mentioned frequency.

Meanwhile, in this drawing, the moving object may be displayed as a moving object UI 400 on the display screen depending upon a positioned location. A first UI object 410 may represent the positioned location of the moving object, and a second UI object 420 may be a display representing an actual location of the moving object. The moving object UI 400 may refer to the location of the moving object displayed on a display screen based on the positioned location represented by the first UI object 410 at any point in time. The moving direction of the moving object may be interpreted as a direction from the moving object UI 400, which is a display position, toward the first UI object 410, which is a positioned location.

After that, the control unit 110 may determine a succeeding displaying by determining whether the moving object rotates at the first target node. A specific example of determining the succeeding displaying will be described in the drawings to be described later.

FIG. 5 is a view for explaining a single path display method depending upon one embodiment of the present invention.

The control unit 110 of the screen display device 100 may generate and display a first correction UI 510 which moves in the first direction D1 in which the moving object 400 moves based on the first positioning data of the first point of the moving 400. After that, the first correction UI 510 may follow a concept of referring to a correction UI generated in a straight section (single path section). The first correction UI 510 may be displayed at a corrected speed compared to an actual speed of the moving object from the first start node to the first end node.

More specifically, the control unit 110 may generate and display the first correction UI 510 through steps to be described later. First, the first starting node may be determined based on the first positioning data. First positioning data obtained by using at least one of the node data, the first sensing data by the sensor unit 140 and the second sensing data by the positioning sensor 200 may be configured to determine the first target node satisfying a preset reference value.

For example, in FIG. 5, the first start node may be determined as the 401 node, which is a display location based on the first positioning data at any point in time. Here, the "node" of the "start node" or "end node" may follow a concept of including a node corresponding to the installation location of the positioning sensor 200 simply included in the node data, as well as the location of the moving object UI 400 displayed at any point in time. It may be assumed that the control unit 110 has recognized a node satisfying a preset reference value in the start node 401, which is node B in FIG. 5, while the moving object is moving in the first direction D1. Then, the node B may be determined as the first target node Nt.

After that, the control unit 110 may determine the first end node, which is the end node of the first correction UI 510, based on the first target node Nt. In this case, the first end node may be determined as the first target node Nt, a next node adjacent to the first target node Nt in the first direction D1, or the like. For example, since the first target node Nt is recognized as node B at the display location 401 of the moving object, the first end node may become node B or node C. If the first end node is the node B, the first correction UI 510 may be displayed in the first section A1, and if the first end node is the node C, the first correction UI 510 may be displayed in the first section A1 and the second section A2. In this drawing, an embodiment in which the first end node Nf is the node C which is a next node adjacent to the first target node Nt in the first direction D1 is illustrated.

After that, the control unit 110 may generate and display the first correction UI 510 displayed at a uniform speed from the first start node 401 to the first end node. The uniform speed may be a speed corrected compared to the speed of an actual moving object. Actual moving objects often do not move at a uniform speed in a specific section, and even if the objects move at a uniform speed, there is a problem in that it is difficult to accurately collect positioning data in real time due to various factors such as an indoor environment with obstacles, communication quality, conditions, and the like. Accordingly, embodiments of the present invention may have an advantage of providing a navigation service accompanied by a smoother and more convenient visual effect to users by determining start/end points based on positioning data obtained based on node data and sensing data, and providing a correction UI (correction animation) in which the moving object UI moves at a uniform speed in a section therebetween. Depending upon an optional embodiment, a plurality of sections displayed at mutually different uniform speeds may be included in an entire section where the correction UI is displayed.

FIG. 6 is a view for explaining a single path display method depending upon another embodiment of the present invention. A description overlapping with FIG. 5 will be omitted with a focus on differences.

In the embodiment of FIG. 6, when the start node is 401, it may be also assumed that node C is recognized as a node satisfying a preset reference value in node 401. In other words, in FIG. 6, the node C may be determined as the first target node Nt. Here, the difference from FIG. 5 is that the target node recognized by the start node is not the node (node B) closest to the start node (current location) among node data, but the next node C adjacent thereto.

After that, the control unit 110 may also determine the first end node, which is the end node of the first correction UI 510', based on the first target node Nt. In this case, the first end node may be determined as the first target node Nt, a next node adjacent to the first target node Nt in the first direction D1, or the like. For example, in this drawing, since the first target node Nt is recognized as node C at the display location 401 of the moving object, the first end node may become node C or node D. If the first end node is the node C, the first correction UI 510' may be displayed in the first and second sections A1 and A2, and if the first end node is the node D, the first correction UI 510' may be displayed in the first to third sections A1, A2 and A3. In this drawing, an embodiment in which the first end node Nf is the node D which is a next node adjacent to the first target node Nt in the first direction D1 is illustrated.

As such, depending upon the screen display method and device depending upon one embodiment of the present invention, a target node may be flexibly and accurately determined depending upon positioning data of a moving object obtained in real time. Accordingly, a navigation service with a smoother and more effective visual effect may be provided to users.

Meanwhile, with reference to FIGS. 5 and 6 as described above, a screen display method will be described with regard to a case in which it is determined that the moving object does not rotate when the control unit determines the succeeding displaying.

If it is determined that the moving object does not rotate at the first end node, the control unit 110 may generate and display the second correction UI moving from the second start node extending in the first direction D1 to the second end node in a succeeding displaying.

Specifically, the control unit 110 may replace the above-described first end node with the second start node and determine the second target node adjacent to the first end node as second end node. After that, the second correction UI displayed at a uniform speed from the second start node to the second end node may be generated and displayed.

For example, referring to FIG. 5 as an example, in an embodiment in which the start node is node 401, the first target node Nt is node B, and the first end node Nf is node C, the control unit 110 may determine whether or not the moving object is rotated at node C, which is the first end node, and may determine that the moving object does not rotate. In this case, the node C, which is the first end node, may be replaced with the second start node of the succeeding displaying, and the node D (not shown) adjacent to the node C node in the moving direction of the moving object in the first direction D1 may be determined as the second starting node. In this case, the next target node may be determined along with determination of whether the first end node C rotates. In other words, in this case, the node D may be recognized as the second target node and determined as the second end node.

After that, the control unit 110 may generate and display the second correction UI (not shown) displayed at a uniform speed from the second start node to the second end node. Hereinafter, a display mode of the screen display method depending upon one embodiment of the present invention will be described with reference to both FIGS. 7 and 8. FIG. 7 is a view for explaining a display mode depending upon one embodiment of the present invention, and FIG. 8 is a view for explaining a display mode depending upon another embodiment of the present invention.

The screen display device 100 may receive a selection signal for a display mode through the communication unit 120 or an input/output module (not shown). In this case, the selection signal may be input by a user's manipulation, or may be executed by a preset algorithm on the control unit 110 or the memory 130, or may be received by the screen display device 100 in various ways. The display mode may include an object switching mode as shown in FIG. 7 and a background switching mode as shown in FIG. 8.

First, referring to FIG. 7, display screens 151 and 152 at mutually different points displayed through a display unit 150 may be illustrated. The display screen 152 on the right may be a screen at a point in time after the display screen 151 on the left. The display mode shown in FIG. 7 may be an object switching mode in which an indoor space image m is fixed and moving object UIs 401 and 402 move. Referring to the two display screens 151 and 152 together, it may be shown that the moving object rotates in the first direction D1 at the node B-3. In this case, the indoor space image m may be fixed, and the moving object UI may move from positions 401 to 402.

Referring to FIG. 8, display screens 151, 152, and 153 at mutually different points in time may be illustrated, and may be display screens depending upon a sequential time flow from the left. The display mode shown in FIG. 8 may be a background switching mode in which the moving object UI 400 is fixed and the indoor space images m1, m2, and m3 move. Referring to the three display screens 151, 152, and 153 together, it may be shown that the moving object rotates in a direction parallel to the first direction D1 at node B-3. In this case, the moving object UI 400 may be fixed, and the indoor space image may be switched from m1 to m2, and then from m2 to m3. In this case, the movement of the indoor space image may be gradually and continuously performed depending upon the indoor space image (map data) stored in the memory 130.

Hereinafter, with reference to FIGS. 9 and 11, embodiments in which it is determined by the control unit 110 that the moving object rotates when determining a succeeding displaying will be described.

First, FIG. 9 is a view for explaining a display method during general rotation. This drawing shows a display example when there is no animation effect through the correction UI for rotation. In this case, the control unit 110 may determine that the moving object rotates in the rotation section R1 formed at node B-3, and accordingly the moving object UI may be displayed as the moving object UI 401 in the section between node A-3 and node B-3 at the first point in time, and may be displayed as the moving object UI 402 in the section between node B-3 and node C-3 at the second point in time after rotation. As shown in FIG. 9, the rotational movement of the moving object is determined only by the separately displayed moving object UI without correction animation, and thus there is a problem in that it is difficult to determine the continuous rotational movement from the start point to the end point. Embodiments of a method and device for displaying a screen through correction animation depending upon the present invention will be described in FIGS. 10 and 11 to be described later.

First, embodiments will be described with reference to FIG. 10. FIG. 10 is a view for explaining a screen display method during rotation depending upon one embodiment of the present invention.

When the control unit 110 determines that the moving object rotates at the first end node (node B-3 in FIGS. 10 and 11) (hereinafter, also referred to as a rotational node Nr), the succeeding displaying may be a step of generating and displaying a third correction UI 530 including a correction UI moving in a second direction D2 different from the first direction D1.

In this case, when generating the third correction UI 530, the control unit 110 may generate the third-1 correction UI 531 moving in the first direction D1 from the first start node 400s to the first end node B-3. After that, it may be possible to generate third-2 correction UI moving in the second direction toward the third end node determined based on the third target node B-2 adjacent to the first end node B-3 in the second direction D2. In this case, the third end node may be a node B-2 or a node B-1 adjacent to the left side of B-2 (not shown), and may be a stopped node (node 400f in FIG. 10) depending on an embodiment, if the moving object stops before node B-2 while moving in the second direction D2.

In this case, in generating the third-1 correction UI 531, the control unit 110 may compare a precedence relationship between the first end node and a subsequent node corresponding to subsequent positioning data obtained at a second point in time after the first point in time. As shown in FIG. 10, when it is determined depending upon the comparison result that the subsequent node is located before the first end node Nr in the first direction D1, the control unit 110 may be configured to rotate any one of the moving object UI 400 and the indoor space image m depending upon the display mode selected depending upon the selection signal based on the first end node Nr between the generating of the third-1 correction UI 531 and the generating of the third-2 correction UI 532.

Specifically, when generating the third-1 correction UI 531, the control unit 110 may stop the aforementioned first correction UI displayed in a section between node A-3 and node B-3. After that, when a display speed of the first correction UI is referred to as a first speed, it may be possible to generate a fourth correction UI that proceeds to the first end node (B-3; Nr) at a second speed different from the first speed. The third-1 correction UI 531 of FIG. 10 may be shown, following a concept of including both the first correction UI and the fourth correction UI. After that, the first end node (B-3; Nr) may rotate depending upon the selected display mode.

In this case, the rotation depending upon the selected display mode may be performed based on direction data shown in the upper right corner of FIG. 10.

The control unit 110 may calculate first direction data about the amount of rotation of the moving object by using the first sensing data.

The "first direction data" may be calculated by performing a fusion operation on the first-1 coordinate values of the first-1 sensing data and the first-2 coordinate values of the first-2 sensing data. The first-1 and first-2 sensing data may follow the concept included in the first sensing data obtained by the sensor unit 140. The first-1 sensing data may be a sensing value obtained by the accelerometer 141, and the first-2 sensing data may be a sensing value obtained by the gyroscope 142. In other words, the rotation amount and rotation direction of the moving object may be calculated by using the sensing values of the accelerometer 141 and the gyroscope 142, which will be described in detail later.

The two sensors 141 and 142 may be three-axis sensors, and the first-1 coordinate value and the first-2 coordinate value are (acc(x), acc(y), acc(z)), (gyr(x), gyr(y), gyr(z)), respectively. The "first direction data" may include the following first change amount, second change amount, and third change amount. Assuming that a radian change per second is a first change amount ($^{66}s1$), a degree change per second is a second change amount ($^{66}s2$), and an actual degree change is a third change amount ($^{66}s3$), each value may be as shown in the following equations.

$$\Delta s1 = \frac{acc(x) \times gyr(x) + acc(y) \times gyr(y) + acc(z) \times gyr(z)}{\sqrt{acc(x)^2 + acc(y)^2 + acc(z)^2}} \quad [\text{Equation 1}]$$

$$\Delta s2 = \frac{\Delta s1 \times 180}{\pi} \quad [\text{Equation 2}]$$

$$\Delta s3 = \frac{\Delta s2 \times (\text{time difference})}{1000} \quad [\text{Equation 3}]$$

In equation 3, 1000 may be a variable determined based on the value of time, meaning that the unit of 1000 is seconds (sec). In other words, referring to equation 3, the third change amount ($\Delta s3$), which is an actual change amount, may be obtained by integrating the second change amount ($\Delta s2$). For example, since the second change amount ($\Delta s2$) is not limited by the amount of rotation and the third change amount ($\Delta s3$) is an actual change amount at a point in time, a degree value at which the third change amount ($\Delta s3$) is accumulated may have a value within the range of degree 0 to 360 degrees. For example, if the moving object rotates and the degree value at which the third change amount ($\Delta s3$) is accumulated becomes a value larger than 360 degrees, a calculation may be made by changing to 0 degree again. If the degree value at which the third change amount ($\Delta s3$) is accumulated becomes a value less than 0 degree, a calculation is made by changing to 360 degrees again.

After that, the control unit 110 may determine the rotation information by associating the aforementioned first direction data and node data to determine second direction data regarding the rotation direction. In this case, as an example of the second direction data, description will be made with reference to the compass variable shown in the upper right corner of FIG. 8.

In this drawing, the compass variable may be set as an example of having four values of East, West, South, North (values of 1, 2, and 3 in a clockwise direction from 0) considering the node data on the possible movement path of the moving object. For example, with an assumption of 0<a<90 (degrees), if the degree value at which the third change amount ($\Delta s3$) is accumulated is greater than or equal to (360−a) degrees and less than or equal to +a degrees, the control unit 110 may determine the second direction data as 0. If the degree value at which the third change amount ($\Delta s3$) is accumulated is greater than or equal to (90−a) degrees and less than or equal to (90+a) degrees, the control unit may determine the second direction data as 1. If the degree value at which the third change amount (Δs3) is accumulated is more than or equal to (180−a) degrees and less than or equal to (180+a) degrees, the control unit may determine the second direction data as 2. And, if the degree value at which the third change amount (Δs3) is accumulated is more than or equal to (270−a) degrees and less than or equal to (270+a) degrees, the control unit may determine the second direction data as 3.

In determining the rotation information, the type of the first direction data and the second direction data and the determination method thereof are not limited to those described above.

FIG. 11 is a view for explaining a screen display method during rotation depending upon another embodiment of the present invention. FIG. 11 shows an embodiment in which it is determined that the subsequent node is ahead of the first end node (B-3; Nr) in the first direction D1 depending upon the comparison result.

In this case, when generating the third-1 correction UI 531, the control unit 110 may generate the fifth correction UI 535 refreshing a location of the moving object to the first end node (B-3; Nr). After that, it may be possible to rotate any one of the moving object UI 400 and the indoor space image m depending upon the display mode selected based on the first end node. In this case, the third-2 correction UI 532 moving in the second direction D2 may be generated and displayed after the fifth correction UI 535 is generated.

The same principle as the rotation based on the direction data described above in FIG. 10 may be also applied to the rotation in the embodiment of FIG. 11.

FIG. 12 is a view for explaining a method for generating a correction UI depending on whether it is stopped or not depending upon one embodiment of the present invention.

In at least one of the aforementioned first displaying and succeeding displaying, the control unit 110 may determine a display stop condition and perform an operation of stop correction. The operation of stop correction may include an operation of stopping the display of the moving object UI 400 for a certain period of time or slowing down a display speed of the moving object UI 400. For example, it may be possible to calculate a distance between the location of the moving object UI 400 displayed at one point in time and the location of the first UI object 410 corresponding to the positioning data obtained at one point in time. As a result of the calculation, if the calculated distance differs by at least a certain distance, that is, if the moving object UI 400 is ahead of the first UI object 410 by at least a predetermined distance, the operation of stop correction may be performed. For example, the predetermined distance may be the length of one section defined by adjacent boundary nodes, but is not limited thereto.

In contrast, when the moving object UI 400 is displayed behind the first UI object 410, the first correction UI described above in FIGS. 5 and 6 may be generated and displayed instead of performing the stop correction operation.

Depending on an embodiment, in determining whether the display of the moving object UI 400 is stopped, the control unit 110 may determine whether to stop based on the first sensing data, which is a sensing value of the sensor unit 140, particularly the accelerometer 141 or the gyroscope 142. For example, if the fusion acceleration value calculated depending upon a certain criterion using the sensing value of the accelerometer differs by at least a certain value between one point in time and another point in time after the one point in time, it may be determined to be a movement. If the fusion acceleration value is differs by at most a certain value, it may be determined as a stop. The fusion acceleration value may be as shown in the following equation, for example, when coordinate values as sensing values of an accelerometer are (acc(x), acc(y), and acc(z)).

$$acc(x)^2 + acc(y)^2 + acc(z)^2 \qquad \text{[Equation 4]}$$

A criterion of a certain value for determining whether to stop may be set differently depending upon a time period in which the control unit 110 obtains the fusion acceleration data.

Meanwhile, the screen display device 100 depending upon one embodiment of the present invention may perform an operation of correcting a recommended path display to be described later.

In performing at least one of the first displaying and succeeding displaying, the control unit 110 may determine whether the subsequent positioning data are deviated by at least a certain distance from the recommended path data. If the determination result is within a predetermined distance, the display on the recommended path may be maintained without correcting the location of the moving object with the obtained positioning data. In contrast, if the determination result is greater than or equal to a certain distance, the location of the moving object may be refreshed with the obtained positioning data, and a new recommended path may be generated and displayed by using the refreshed point as a starting point.

FIG. 13 is a flowchart for explaining a screen display method depending upon one embodiment of the present invention. The screen display method may include steps to be described later, and will be described with reference to the above-described drawings.

Node data including information about the location of the positioning sensor may be set depending upon a rule set in advance on a movement path through which the moving object may move with respect to the indoor space (S100).

After that, there may be performed a first displaying for, on the basis of first positioning data of a first point of the moving object, generating and displaying a first correction UI moving in a first direction in which the moving object moves, the first correction UI being displayed in a corrected speed compared to the actual speed of the moving object from a first start node to a first end node (S200).

The first displaying may include: determining the first start node on the basis of the first positioning data; determining a first target node for which the first positioning data obtained by using the node data satisfies a preset reference value; determining the first end node on the basis of the first target node; and generating and displaying a first correction UI displayed at a uniform speed from the first start node to the first end node.

After that, a succeeding displaying by determining whether the moving object rotates at first target node may be determined (S300). In this drawing, S300 is shown to be performed after S200, but S200 and S300 may be performed in parallel depending on an embodiment. In other words, whether the moving object rotates may be determined based on node data and the first positioning data regardless of whether or not the reference value is satisfied, in this case, the first target node may be a rotational node rather than a node satisfying the reference value.

FIG. 14 is a flowchart for more specifically explaining S300, which is a part of a screen display method depending upon one embodiment of the present invention. The determining of succeeding displaying (S300) may include the steps to be described later.

If it is determined that the moving object does not rotate in the determining of the succeeding displaying (S300-N), the succeeding displaying may include a second displaying of generating and displaying a second correction UI moving from the second start node extending in the first direction to the second end node. In this case, the second displaying may be configured to replace the first end node with the second start node and determine the second target node adjacent to the first end node as the second end node (S310). After that, the second correction UI displayed at a uniform speed from the second start node to the second end node may be generated and displayed (S320). The second correction animation may be generated depending upon the same principle as the first correction animation.

In contrast, if it is determined that the moving object rotates in the determining of the succeeding displaying (S300-Y), the succeeding displaying may include a third displaying of generating and displaying a third correction UI moving to the second start node different from the first direction. In this case, the third displaying may be configured to generate the third-1 correction UI moving in the first direction from the first start node to the first end node (S330). After that, it may be possible to generate third-2 correction UI moving in the second direction with a third target node adjacent to the first end node in the second direction set as a third end node.

The screen display method of the present disclosure may further include receiving a selection signal for a display mode (S350). The display mode may include an object switching mode in which an indoor space image is fixed and a moving object UI moves and a background switching mode in which the moving object UI is fixed and the indoor space image moves.

The generating of the third-1 correction UI (S330) may include the following embodiments.

The generating of the third-1 correction UI (S330) may further include comparing a precedence relationship between the first end node and a subsequent node corresponding to subsequent positioning data obtained at a second point in time after the first point in time. If it is determined depending upon the comparison result that the subsequent node is located before the first end node in the first direction, rotating any one of the moving object UI and the indoor space image depending upon the display mode selected depending upon the selection signal based on the first end node between the generating of third-1 correction UI (S330) and the generating of third-2 correction UI (S340).

Depending upon another embodiment, the generating of the third-1 correction UI (S330) may include: if it is determined depending upon the comparison result that the subsequent node is located before the first end node in the first direction, generating a fifth correction UI 535 for refreshing a location of the moving object to the first end node; and rotating any one of the moving object UI and the indoor space image depending upon the display mode selected depending upon the selection signal based on the first end node.

After the above-described S310, S320, S330, and S340, it may be determined whether subsequent positioning data has been collected or not for at least a certain period of time (S360), and if not collected, the steps may end (S360-Y). If the subsequent positioning data is collected within a predetermined time (S360-N), the aforementioned steps may be repeated again.

As such, in the screen display method depending upon embodiments of the present invention, a method and a device for displaying a screen with improved accuracy in real time may be provided by using a positioning algorithm which utilizes node data within a movable path.

In addition, it may be possible to minimize an error between the actual location of the moving object and the displayed location, and to provide smoother and more seamless visual effects, and thus high-quality navigation service to users by generating a correction UI (correction animation) which corrects errors in various cases which occur when performing indoor positioning algorithms.

Embodiments depending upon the present invention as described above may be implemented in the form of a computer program which may be executed on a computer through various components, and such a computer program may be recorded on a computer-readable medium. In this case, the medium may store a program executable by a computer. Examples of the medium may include magnetic media such as hard disks, floppy disks and magnetic tapes, optical recording media such as CD-ROM and DVD, magneto-optical media such as floptical disks, and ROM, RAM, flash memory, etc., and thus may be configured to store program instructions.

Meanwhile, the computer program may be specially designed and configured for the present invention, or may be known and usable to those skilled in the art of computer software. An example of a computer program may include not only machine language codes generated by a compiler but also high-level language codes which may be executed by a computer using an interpreter or the like.

In addition, although preferred embodiments of the present invention have been shown and described above, the present invention is not limited to the specific embodiments described above. Of course, various modifications can be made by those skilled in the art to which the present invention pertains without departing from the gist of the present invention claimed in the claims, and these modifications should not be individually understood from the technical spirit or perspective of the present invention.

Therefore, the spirit of the present invention should not be limited to the above-described embodiments, and all scopes equivalent to or equivalently changed from the claims as well as the claims described below would be considered to fall within the scope of the spirit of the present invention.

The invention claimed is:

1. A screen display method depending upon indoor positioning, the method comprising:
   by a control unit, setting, for an indoor space, depending upon a preset rule on a movement path on which a moving object is movable, node data including information about a location of a positioning sensor;
   displaying, on a screen of a display unit, a first display for, on a basis of first positioning data of a first point of the moving object, generating and displaying a first correction user interface (UI) moving in a first direction in which the moving object moves, the first correction UI being displayed in a corrected speed compared to an actual speed of the moving object from a first start node to a first end node such that an error between an actual location of the moving object and a displayed location of the moving object is corrected; and
   determining a succeeding displaying by determining whether the moving object rotates at the first end node.

2. The method of claim 1, wherein the displaying of the first display comprises:
   determining the first start node on the basis of the first positioning data;

determining a first target node for which the first positioning data obtained by using the node data satisfies a preset reference value;
determining the first end node on a basis of the first target node; and
generating and displaying a first correction UI displayed at a uniform speed from the first start node to the first end node.

3. The method of claim 1, wherein when it is determined that the moving object does not rotate in the determining of the succeeding displaying, the succeeding displaying comprises a second displaying for generating and displaying a second correction UI moving from a second start node extending in the first direction to a second end node, in which the second displaying comprises: replacing the first end node with the second start node and determining a second target node adjacent to the first end node as the second end node; and generating and displaying a second correction UI displayed at a uniform speed from the second start node to the second end node.

4. The method of claim 1, wherein when it is determined that the moving object rotates in the determining of the succeeding displaying, the succeeding displaying comprises a third displaying for generating and displaying a third correction UI moving in a second direction different from the first direction, in which the third displaying comprises; generating third-1 correction UI moving in the first direction from the first start node to the first end node; and generating third-2 correction UI moving in the second direction toward a third end node determined based on a third target node adjacent to the first end node in the second direction.

5. The method of claim 4, wherein the screen display method further comprises receiving a selection signal for a display mode, in which the display mode includes an object switching mode in which an indoor space image is fixed and a moving object UI moves and a background switching mode in which the moving object UI is fixed and the indoor space image moves.

6. The method of claim 5, wherein the generating of third-1 correction UI further comprises comparing a precedence relationship between the first end node and a subsequent node corresponding to subsequent positioning data obtained at a second point after the first point, and comprises, when it is determined depending upon the comparison result that the subsequent node is located before the first end node in the first direction, rotating any one of the moving object UI and the indoor space image depending upon the display mode selected depending upon the selection signal based on the first end node between the generating of third-1 correction UI and the generating of third-2 correction UI.

7. The method of claim 5, wherein the generating of third-1 correction UI further comprises comparing a precedence relationship between the first end node and a subsequent node corresponding to subsequent positioning data obtained at a second point after the first point, and wherein when it is determined depending upon the comparison result that the subsequent node is located before the first end node in the first direction, the generating of third-1 correction UI comprises: generating a fifth correction UI for refreshing a location of the moving object to the first end node; and rotating any one of the moving object UI and the indoor space image depending upon the display mode selected depending upon the selection signal based on the first end node.

8. The method of claim 1, wherein at least one of the displaying of the first display and the succeeding displaying comprises: calculating a distance between a location of the moving object UI displayed based on the first positioning data and a location corresponding to the first positioning data; and performing an operation of stop correction of the moving object UI, when a location of the moving object UI is ahead of a location corresponding to the first positioning data by a predetermined distance.

9. A screen display device depending upon indoor positioning, the device comprising: a control unit,
wherein the control unit is configured to:
set, for an indoor space, depending upon a preset rule on a movement path on which a moving object is movable, node data including information about a location of a positioning sensor;
generate and display, on a screen of a display unit, a first correction UI moving in a first direction in which the moving object moves on a basis of first positioning data of a first point of the moving object, the first correction UI being displayed in a corrected speed compared to an actual speed of the moving object from a first start node to a first end node such that an error between an actual location of the moving object and a displayed location of the moving object is corrected; and
determine a succeeding displaying by determining whether the moving object rotates at the first end node.

10. The device of claim 9, wherein the control unit is configured to determine the first start node on the basis of the first positioning data when generating and displaying the first correction UI; determine a first target node for which the first positioning data obtained by using the node data satisfies a preset reference value; determine the first end node on a basis of the first target node; and generate and display the first correction UI displayed at a uniform speed from the first start node to the first end node.

11. The device of claim 9, wherein when it is determined that the moving object does not rotate when the control unit determines the succeeding displaying, in which the succeeding displaying is configured to generate and display a second correction UI moving from a second start node extending in the first direction to a second end node, in which the control unit is configured to replace the first end node with the second start node and determine a second target node adjacent to the first end node as the second end node, and generate a second correction UI displayed at a uniform speed from the second start node to the second end node.

12. The device of claim 9, wherein when it is determined that the moving object rotates when the control unit determines the succeeding displaying, the succeeding displaying is configured to generate and display a third correction UI moving in a second direction different from the first direction, in which the control unit is configured to generate third-1 correction UI moving in the first direction from the first start node to the first end node, and generate third-2 correction UI moving in the second direction toward a third end node determined based on a third target node adjacent to the first end node in the second direction.

13. The device of claim 12, wherein the screen display device is configured to receive a selection signal for a display mode, in which the display mode includes an object switching mode in which an indoor space image is fixed and a moving object UI moves and a background switching mode in which the moving object UI is fixed and the indoor space image moves.

14. The device of claim 13, wherein when generating the third-1 correction UI, the control unit is configured to compare a precedence relationship between the first end node and a subsequent node corresponding to subsequent positioning data obtained at a second point after the first point, and when it is determined depending upon the comparison result that the subsequent node is located before the first end node in the first direction, the control unit is configured to rotate any one of the moving object UI and the indoor space image depending upon the display mode selected depending upon the selection signal based on the first end node after generating the third-1 correction UI and before generating the third-2 correction UI.

15. The device of claim 13, wherein when generating the third-1 correction UI, the control unit is configured to compare a precedence relationship between the first end node and a subsequent node corresponding to subsequent positioning data obtained at a second point after the first point, and when it is determined depending upon the comparison result that the subsequent node is ahead of the first end node in the first direction, the control unit is configured to generate a fifth correction UI for refreshing a location of the moving object to the first end node, and rotate any one of the moving object UI and the indoor space image depending upon the display mode selected depending upon the selection signal based on the first end node.

16. The device of claim 9, wherein when performing any one of the displaying of the first correction UI and the succeeding displaying, the control unit is configured to calculate a distance between a location of the moving object UI displayed based on the first positioning data and a location corresponding to the first positioning data, and perform an operation of stop correction of the moving object UI, when a location of the moving object UI is ahead of a location corresponding to the first positioning data by a predetermined distance.

* * * * *